3,284,197

METHOD FOR MAKING LITHOGRAPHIC PLATES

Daniel Smith, Riverdale, N.Y., and James W. Howard, Pompton Lakes, and Paul W. Greubel, Great Neck, N.J., assignors to Interchemical Corporation, New York, N.Y., a corporation of Ohio No Drawing. Filed Nov. 6, 1961, Ser. No. 150,155
1 Claim. (Cl. 96—33)

This invention relates to lithographic plate making and more particularly to a novel method for producing the exposed light-sensitive coating-covered base used in the production of lithographic plates.

The vast majority of lithographic plates used commercially are now produced by one of four processes: the deep-etch, surface, bimetallic and presensitized plate making processes. Each of these methods involves the exposure of a light-sensitive coating on a metal base to light through a transparency, either negative e.g., in the surface plate process or positive e.g., in the deep-etch process, of the image or design to be lithographically printed.

The negative or positive transparencies are conventionally produced photographically from an original image or design and are in effect photographic negatives and positives. This conventional process is known as the photolithographic method of making plates.

While the photolithographic process provides a plate of high fidelity in the reproduction of fine detail, the production of photographic transparencies of graphic originals is often sufficiently time consuming to make lithographic printing uneconomical, particularly where high degree of reproduction of fine detail is not required e.g., in the printing of handbills or labels.

We have now found a method for producing the exposed light-sensitive coating-covered base in the production of lithographic plates which eliminates the photographic steps and is thereby less time consuming. Further, our method also eliminates the need for relatively expensive photographic equipment. Thus, our invention provides a method of making lithographic plates which is in all respects more economical than conventional photolithographic methods.

In accordance with this invention a negative or positive transparency is first prepared from the graphic original which is to be lithographically printed. The graphic original may be printed matter, diagrams, handwritten material, photographs or any other material which may be reproduced on heat-sensitive paper as described in U.S. Patent No. 2,740,896. The graphic original should have graphic representations highly absorptive of infra-red rays on a background which is relatively non-absorptive of infra-red rays. The graphic original is placed in heat-conductive relationship with a coated sheet comprising a transparent base carrying a coating which responsive to heat, changes in transparentness, and then irradiated with infra-red rays whereby the rays are absorbed and converted to heat by the graphic representations on the original and said heat is transferred to said coated sheet to produce a change in transparentness in the coating carried thereon in a pattern corresponding to said graphic representations to produce either a negative or a positive transparency. The light-sensitive coating carried on the base of the initial lithographic plate structure is then exposed to light through said transparency to produce the exposed plate.

The exposed plate may thereafter be treated in accordance with the conventional procedure for producing the lithographic plate desired, e.g., deep-etch, surface or presensitized plate making procedures.

It will, of course, be understood that the nature of the light-sensitive coating will vary with the nature of the plate being produced e.g., albumin and ammonium bichromate in surface plates or gum arabic and ammonium bichromate in deep-etch plates. Also, the base material will vary with the plate being produced. Usually, the base plate is of a metal as aluminum or zinc, but it may be made of paper or other non-metals.

The graphic original and the coated sheet in heat-conductive relationship may be suitably irradiated with infra-red rays in accordance with the procedure described in U.S. Patent 2,740,896.

The coated sheet preferably comprises a transparent base sheet carrying a coating which changes in transparentness in response to heat. In sheets used for making positive transparencies, the coating is initially transparent and after the irradiation, in response to heat, the areas of the coating coincident with the graphic representations on the graphic original become intransparent. In sheets used for making negative transparencies, the coating is initially opaque or intransparent and in response to heat, the areas of the coating coincident with the graphic representations become transparentized.

A heat-sensitive transparent sheet of the type described in U.S. Patent No. 2,740,896 in which an intransparent image forms as a result of a locally heat induced opaqueness producing chemical reaction that takes place between two or more components in the coating on the sheet may be used for the positive transparencies in the method of this invention.

Negative transparencies may be conveniently produced using a variety of heat-sensitive sheets such as sheets comprising a transparent base carrying the visibly opaque heat-transparentizable coatings, described in U.S. Patent No. 2,859,351 which comprise waxy particles dispersed in a resinous film-forming organic infusible at the fusion temperature of the waxy particles; the fusible waxy particles should have a melting point of 60–115° C.

However, best results have been achieved when the negative transparencies comprise a transparent supporting base carrying a heat sensitive visibly opaque lacquer coating as described in the copending application of A. E. Bollinger entitled, "Method of Making Copies and Heat-Sensitive Copying Sheets," filed on or about the same date as the present application. As set forth in said copending application blushed lacquer films are old in the art. Numerous U.S. patents described how such films can be produced, e.g. U.S. Patents Nos. 2,207,659, 2,262,270, 2,296,337, 2,299,991, 2,306,525, 2,519,660 and 2,665,262. A blushing lacquer is made by dissolving a film-forming material such as nitrocellulose, ethyl cellulose, cellulose acetate and vinyl resin, with or without plasticizer, colorants, or other additives, in a mixture of volatile liquids of different boiling point and evaporation rate; the liquid with the fastest evaporation rate being a solvent for the film-former while the slower evaporating liquid is a nonsolvent for the film-former. Thus when the blushing lacquer is applied to a substrate and the volatile liquids are allowed to evaporate the liquid mixture becomes less and less a solvent for the film-former as the more volatile solvent evaporates. The film-former precipitates from such a system as an opaque, or "blushed" film.

In order to achieve best results, it is important that opaque or intransparent areas in the transparency are substantially impervious to blue, violet and particularly ultraviolet light. The light-sensitive coatings used in lithographic plate making are particularly sensitive to ultraviolet light and the transmission of even minimal amounts of ultraviolet light through the visibly opaque areas of the transparencies will have some deleterious effects on the plate produced. Further, since the great majority of exposures of light-sensitive coatings in plate making is accomplished by means of arc lamps which are high in blue and ultraviolet light, it becomes more important that the opaque areas are substantially impervious to blue, violet and ultraviolet light.

Where the visibly opaque blushed coatings described above are used, it has been found that if an ultraviolet light and blue light absorbing dye, particularly a yellow dye, is incorporated into the original heat-sensitive blushed lacquer coating composition, the opaque areas on the transparencies produced are substantially impervious to blue, violet and ultraviolet while the transparent area on the transparencies permit the passage of sufficient light to obtain a good exposure of the light-sensitive coating carried on the base plate. Very suitable dyes for the blushed lacquer coatings are provided by yellow azo dyes such as 4-nitro-4′ amino azobenzene. While the concentration of the dyestuff may be varied, it has been found that concentrations of from about .05 to 0.3% based upon the total weight of the blushed lacquer coating composition will give very good results. It should be understood that where the coating being exposed is sensitive to light other than blue or ultraviolet, a dye having selective absorption in the area of sensitivity may be used.

The transparent base sheet is preferably of a material which is highly transparent. Best results have been achieved using sheets of transparent polyethylene terephthalate, although transparent sheets of other materials such as cellophane, cellulose acetate, polyethylene, polypropylene and celluloid may be used.

It should be noted that the transparencies may be produced from the graphic originals using either the "front-printing" or "back-printing" techniques described in U.S. Patent No. 2,859,351.

The following example in which parts are by weight will further illustrate the invention.

*Example*

A blushing lacquer consisting of the following (by weight): 3.30 parts stearic acid, 1.30 parts butyl stearate, 2.65 parts di-butyl phthalate, 30.95 parts xylol, 13.00 parts VM&P Naphtha, 32.45 parts isopropyl acetate, 1.95 parts glycerol-phthalate alkyd (50% solution in xylol), 14.40 parts ½ sec. RS Nitrocellulose and further containing 0.1% (based on the lacquer weight) of 4-nitro-4′ amino azobenzene yellow dyestuff is coated upon a transparent base sheet, 2 mils in thickness of polyethylene terephthalate resin marketed by E. I. du Pont de Nemours and Co., Inc., under the trademark "Mylar" and allowed to dry at room temperature. Using the "front-printing" technique, the coated sheet is placed in heat-conductive relationship with a graphic original and is passed through a "Thermo-Fax Copying Machine" (marketed by Minnesota Mining and Manufacturing Co.). A negative transparency is produced. The negative transparency is then placed in contact with a conventional presensitized plate comprising an aluminum base coated with a diazo-sensitized coating comprising a water soluble resin formed by the reaction of diazodiphenylamine and formaldehyde and the coating on the presensitized plate is exposed to 50 amp. high intensity carbon arc at a distance of 18 inches for 15 seconds. The exposed plate may then be developed in the conventional manner for developing presensitized plates, e.g., developed by treating with water or dilute gum.

The resulting plate when used on a Davidson lithographic press produces very good printed copies of the graphic original.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of this invention.

What is claimed is:

In the method for the preparation of lithographic plates, the improvement which comprises preparing a transparency from a graphic original having graphic representations highly absorptive of infra-red rays on a background which is relatively non-absorptive of infra-red rays by placing the original in heat-conductive relationship with a coated sheet comprising a transparent base carrying an opaque blushed lacquer coating containing a yellow ultraviolet light absorbing dye which coating transparentizes responsive to heat, irradiating the original with infra-red rays whereby the rays are absorbed and converted to heat by the graphic representations on the original and said heat is transferred to said coated sheet to produce a transparentness in the coating carried thereon in a pattern corresponding to said graphic representations and then exposing a light sensitive coating carried on a lithographic plate base to light through said transparency.

References Cited by the Examiner

UNITED STATES PATENTS

| | | | |
|---|---|---|---|
| 2,494,053 | 1/1950 | Mitson et al. | 96—33 |
| 2,552,233 | 5/1951 | Tate et al. | 117—36.7 X |
| 2,740,896 | 4/1956 | Miller | 117—144 |
| 2,770,534 | 11/1956 | Marx | 101—42 |
| 2,808,777 | 10/1957 | Roshkind | 96—33 X |
| 2,859,351 | 11/1958 | Clark et al. | 117—36.7 X |
| 2,927,039 | 3/1960 | Vander Weel | 117—36.7 |
| 3,057,999 | 10/1962 | Newman et al. | 250—65.1 |
| 3,070,428 | 12/1962 | Cohen | 250—65.1 X |
| 3,100,702 | 8/1963 | Rauner et al | 96—33 |
| 3,103,881 | 9/1963 | Grieshaber | 250—65.1 |
| 3,147,377 | 9/1964 | Newman | 250—65.1 |

NORMAN G. TORCHIN, *Primary Examiner.*

R. L. STONE, R. SMITH, *Assistant Examiners.*